United States Patent
Von Orelli et al.

(10) Patent No.: US 7,671,991 B2
(45) Date of Patent: Mar. 2, 2010

(54) HANDHELD COLOUR MEASUREMENT DEVICE

(75) Inventors: Adrian Von Orelli, Zürich (CH); Michael Lanker, Pfäffikon (CH); Beat Frick, Buchs (CH); Thomas Kunz, Dällikon (CH); Mario Offermann, Buchs (CH)

(73) Assignee: X-Rite Europe GmbH, Regensdorf (CH)

( * ) Notice: Subject to any disclaimer, the term of this patent is extended or adjusted under 35 U.S.C. 154(b) by 343 days.

(21) Appl. No.: 11/784,080

(22) Filed: Apr. 5, 2007

(65) Prior Publication Data

US 2008/0013077 A1 Jan. 17, 2008

(30) Foreign Application Priority Data

Apr. 10, 2006 (EP) .................................. 06007500

(51) Int. Cl.
*G01J 3/46* (2006.01)
(52) U.S. Cl. ........................................ 356/402; 356/446
(58) Field of Classification Search ................. 356/402, 356/446

See application file for complete search history.

(56) References Cited

U.S. PATENT DOCUMENTS

| 4,632,558 A | * | 12/1986 | Maassen et al. ............. 356/404 |
| 4,795,254 A | * | 1/1989 | Kravetz .................... 356/243.5 |
| 6,061,140 A |   | 5/2000 | Berg et al. |
| 6,590,648 B1 |  | 7/2003 | Orelli et al. |

FOREIGN PATENT DOCUMENTS

| DE | 100 19 574 | 10/2001 |
| EP | 1150159 | 10/2001 |

* cited by examiner

*Primary Examiner*—Gregory J Toatley, Jr.
*Assistant Examiner*—Abdullahi Nur
(74) *Attorney, Agent, or Firm*—McCarter & English, LLP

(57) ABSTRACT

A handheld color measurement device includes a housing in which an optoelectronic measurement unit is located which receives measurement light originating from a measurement object, converts it into corresponding electrical measurement signals and processes these measurement signals into preferably digital measurement data characterizing the color of the measurement object. It further includes passive components required for the realization of different application functions, such as measurement windows and reference standards, which can be selectively positioned into the measurement beam path of the measurement unit. The passive components are positioned in a first housing block (100) and the optoelectronic measurement unit as a whole in a second housing block (200). The second housing block is adjustable into several defined application positions relative to the first housing block, in which application positions respectively one of the passive components is located in the measurement beam path of the opto-electronic measurement unit.

This special division into two mutually relatively adjustable housing blocks allows an easy realization of a compact color measurement device suitable for many application functions, which is distinguished by a particular user friendliness.

27 Claims, 6 Drawing Sheets

HANDHELD COLOUR MEASUREMENT DEVICE

BACKGROUND OF THE INVENTION

The invention relates to a handheld colour measurement device, especially a handheld spectrophotometer.

Numerous variants of handheld colour measurement devices of the generic type are on the market. The best representatives are, for example, the devices "Eye-One" and "Spectro Eye" of the company Gretag-Macbeth AG, Regensdorf, Switzerland, as well as the devices "Pulse" of the company X-Rite Inc., Grandville, Mich. 49418, U.S.A. and "PrintFix Pro" of the company Datacolor, Lawrenceville, N.J. 08648, U.S.A.

Handheld colour measurement devices of the type discussed herein can be based on any measurement technology. For example, they can be constructed as filter or spectral measurement devices, whereby the latter are the most universal, since as known all of the other parameters of interest in the practice (for example colour values, colour density values etc.) can be derived from the spectral measurement values. The above mentioned known devices are all spectral measurement devices.

Handheld colour measurement devices can furthermore be constructed as autonomous devices or as measurement peripherals for use in connection with a controlling computer. Autonomous handheld colour measurement devices include all control and display structures required for the measurement operation as well as their own power supply and are furthermore additionally often also provided with an interface for communication with a computer, whereby both measurement data as well as control data can be exchanged with the computer. Handheld colour measurement devices designed as measurement peripherals generally have no inherent control and display structures and are like any other computer peripheral—controlled by the superior computer. For communication with a computer, modem handheld colour measurement devices are often provided with a so called USB-interface (Universal Serial Bus), through which in many cases the power supply is simultaneously achieved (from the connected computer). Such a measurement device concept is described, for example, in U.S. Pat. No. 6,590,648 (=EP 1067369 A1).

Handheld colour measurement devices of the generic type can be used for many measurement applications depending on the construction and accessories. The classic base application function is the measurement on coloured substrates, typically a printed product. The handheld colour measurement device is thereby manually positioned on the substrate so that the desired measurement location is located in the field of view (capture region) of the measurement device. Many known handheld colour measurement devices are equipped with aiming aids which facilitate the correct positioning of the device for the user.

A further classic application function is the serial measurement at a multitude of measurement locations on a substrate, typically a colour measurement strip. This application function is normally referred to as Scanning. The handheld colour measurement devices thereby manually guided across the measurement locations, whereby also mechanic guiding devices, for example tracks or the like, can be used.

In a further application function, several known handheld colour measurement devices can also be used for the measurement on monitors. The handheld colour measurement device is thereby manually positioned on the monitor to be measured, whereby it either touches the monitor or is positioned at a small distance therefrom {preferably less than 20 cm). Furthermore, handheld colour measurement devices can in further applications also be used for the measurement of the ambient light or possibly for (remote) measurements on a projection surface which is illuminated, for example, by an electronic projector (beamer). These points are described, for example in EP 1150559 A1 and U.S. Pat. No. 6,590,648 (=EP 1067369 A1).

A special case of application functions consists in the execution of calibration or reference measurements on white or possibly also coloured reference measurement objects (for example a white tile or reference colour surfaces). For example, the handheld colour measurement devices known for this purpose are equipped with incorporated reference measurement objects, which can be manually placed into the measurement beam path. Alternatively, some handheld colour measurement devices are equipped which external reference measurement objects as accessories on which the measurement device can be positioned as in the case of the normal measurement.

Principally, all of the mentioned applications can be realized with most of the known handheld colour measurement devices. However, except for the basic application, more or less significant practical handling difficulties occur in many cases. Either special accessories are required for some applications or the orientation of the measurement device is not possible without auxiliary means or the specific application is overall only relatively laboriously realizable.

SUMMARY OF THE INVENTION

A handheld colour measurement device of the generic type should be improved so that it is easily usable for all mentioned applications and without awkward handling and thereby does not need any accessories.

The invention is characterized by an handheld colour measurement device with a housing in which an opto-electronic measurement unit is located which receives measurement light originating from a measurement object and converts it into corresponding electric measurement signals and processes the measurement signals into preferably digital measurement data characterizing the colour of the measurement object, and having passive components required for the realization of different application functions, which components can be selectively moved into the measurement beam path, characterized in that the passive components are positioned in a first housing block, that the opto-electronic measurement unit is located in a second housing block, and that the second housing block is adjustable relative to the first housing block to several, defined application positions in which application positions one of the passive components is respectively located in the measurement beam path of the opto-electronic measurement unit.

BRIEF DESCRIPTION OF THE DRAWINGS

The invention is further discussed in the following by reference to the drawings. It is shown in.

DETAILED DESCRIPTION OF THE PREFERRED EMBODIMENTS

Figure 1:
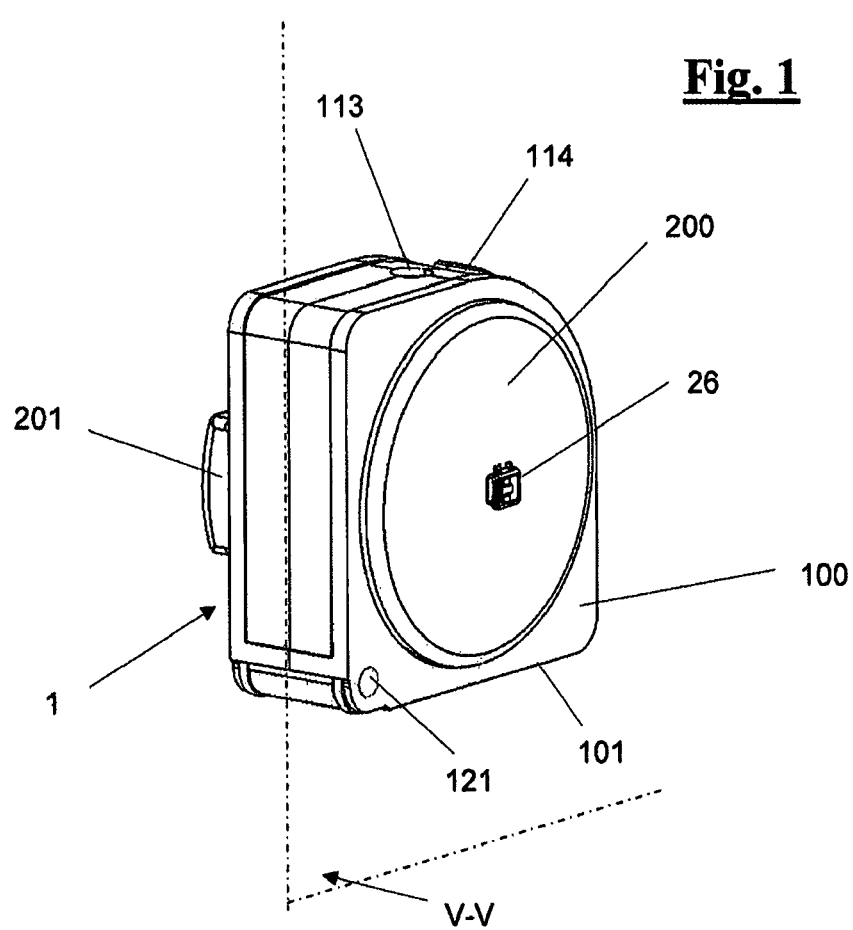
FIG. 1 an exemplary embodiment of the handheld colour measurement device in accordance with the invention in oblique view.

As is shown in FIG. 1, the outer shape of the illustrated exemplary embodiment of the handheld colour measurement device in accordance with the invention is essentially a square cube with a rounded corner. In practical use, the handheld colour measurement device stands upright as shown in the Figures, the flat underside 101 thereby serving as supporting surface. The depth of the device (perpendicular to the square side surfaces) is significantly smaller compared to the length and height.

Figure 2:
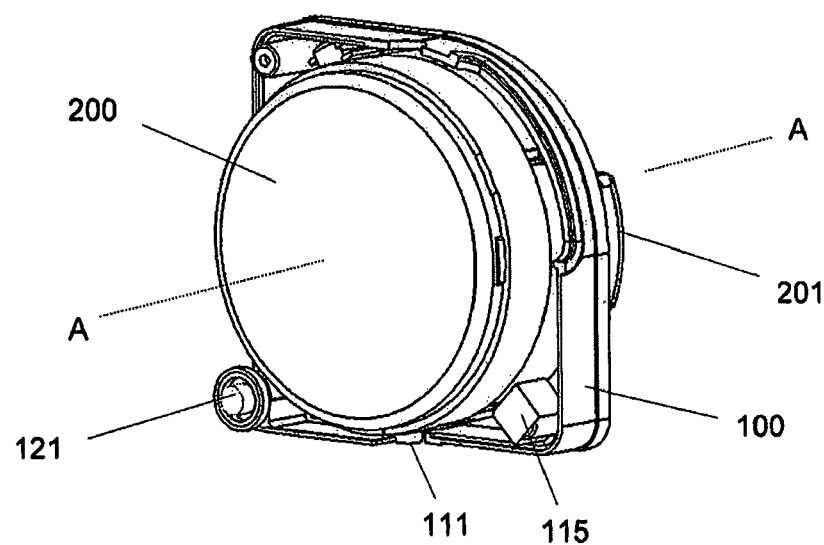
FIG. 2 the handheld colour measurement device of FIG. 1 with a removed outer housing portion.
Figure 3:
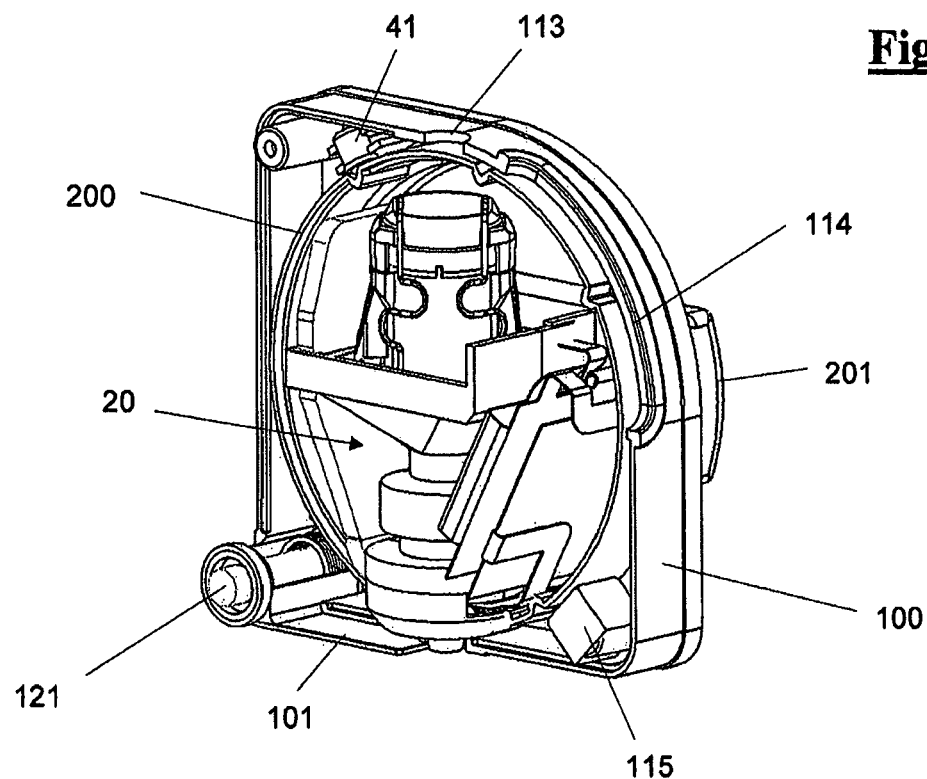
FIG. 3 the interior of the handheld colour measurement device of FIG. 1.
Figure 4:
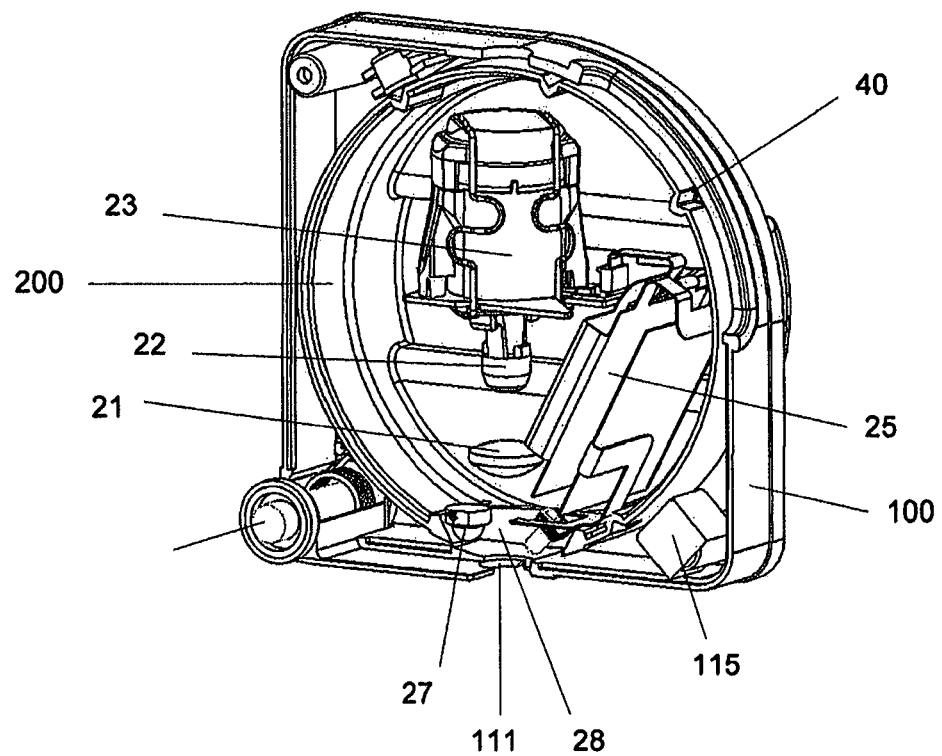
FIG. 4 a plan view analogous to FIG. 3, whereby some functionally unimportant details are omitted.
Figure 5:
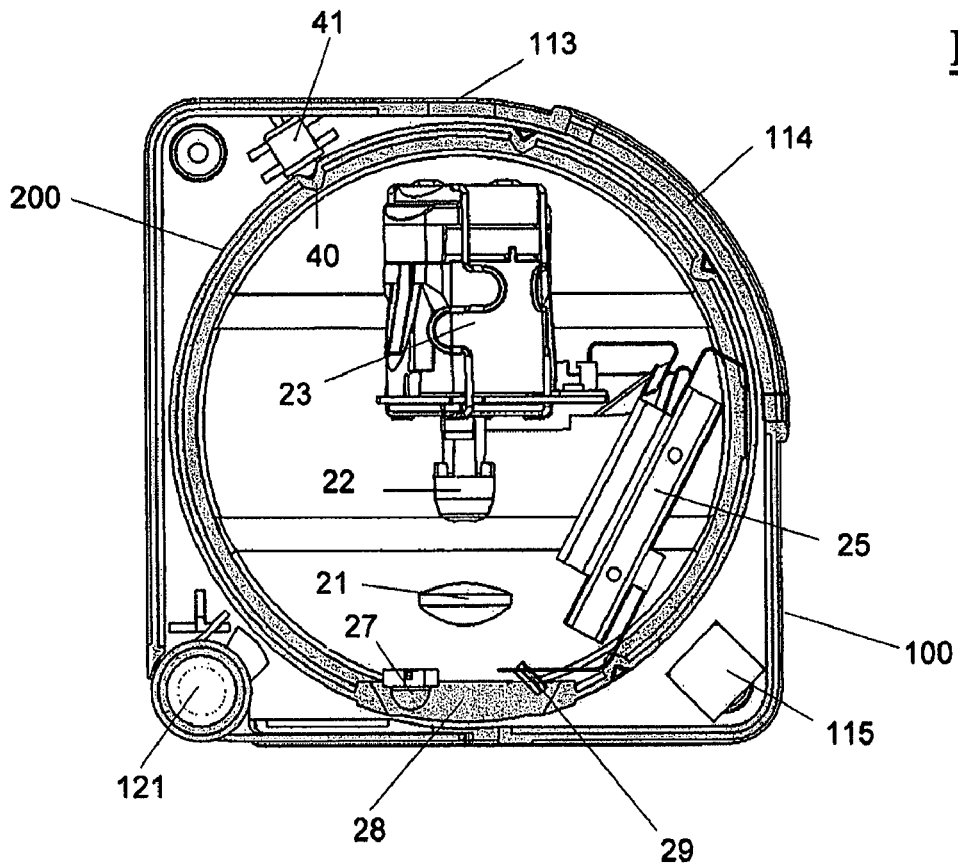
FIG. 5 a Cross-section through the handheld colour measurement device in the plane V-V in FIG. 1, whereby only functionally essential details are illustrated.
Figure 6:
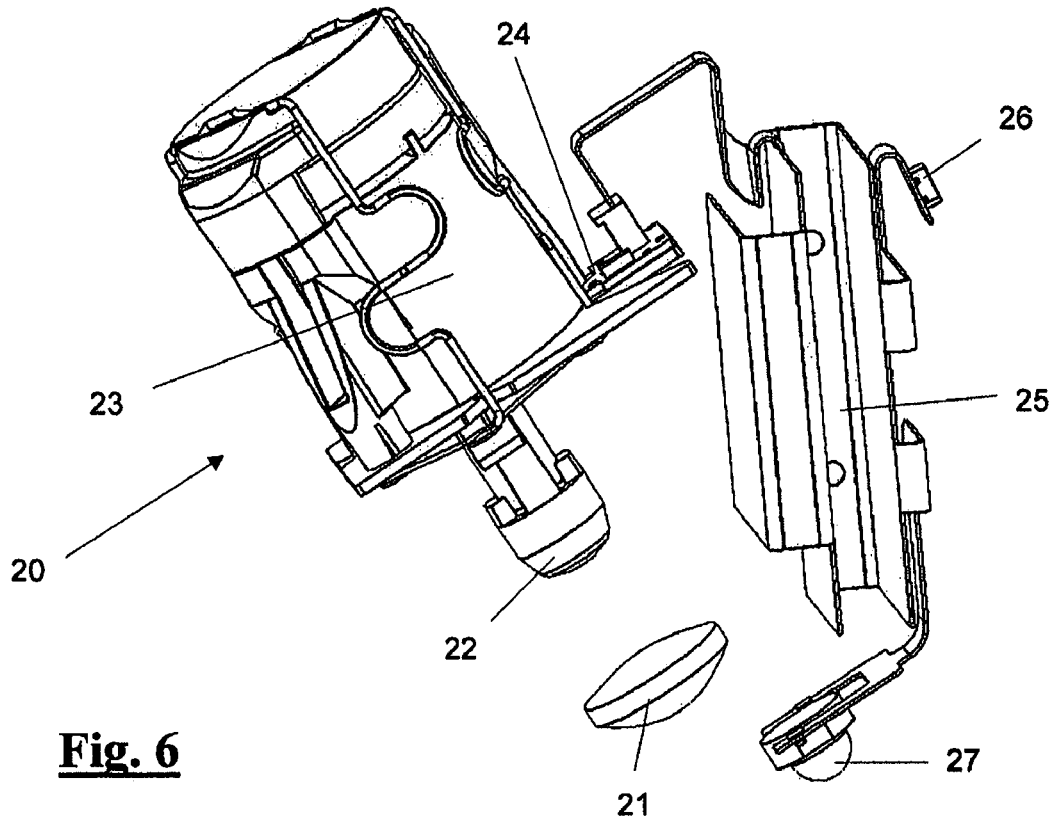
FIG. 6 an oblique view of the opto-electronic measurement arrangement of the handheld colour measurement device.

An important aspect of the invention consists in a special division and structural combination of the individual functional components of the device. As illustrated in FIGS. 2 and 3, the handheld colour measurement device is divided into two device blocks 100 and 200 which can be moved, relative to one another, into different, defined positions. In the illustrated exemplary embodiment, the first device block 100 is of essentially circular shape and at the Same time forms the largest part of the device housing 1. The second device block 200 is essentially drum shaped and supported in the first device block 100 for rotation about its axis A. The totality of all possible defined rotational positions which the second block 200 can take up within the first device block 100 is in the following referred to as use positions. As is apparent especially from FIGS. 3 to 5, the second (in this exemplary embodiment inner) device block 200 includes the complete opto-electronic measurement unit 20 of the handheld colour measurement device. It includes all optical and electronic components which are required for the capture of the measurement light originating from the measurement object as well as its further conversion into corresponding measurement signals and for their processing into preferably digital measurement data. Individually they are, as shown especially clearly in the detailed illustration of FIG. 6, an input Jens 21, a pickup head 22, a spectrometer 23 with associated electronic 24 for the light converters included in the spectrometer 23 and a processing and control electronic 23 which is preferably built on a flexible and, for reasons of space savings, folded circuit board. For communication with an external computer, a USB-interface 26 is provided through which the Power supply is also carried out at the same time. For remission measurements on measurement objects which themselves do not illuminate, a light source 27 is further provided in the form of a white light emitting diode, which is also controlled by the processing electronic 25. For gloss measurements (measurements of measurement light which is reflected in a specific direction by the measurement object), an addition optical sensor 29 (FIG. 5) can be provided as generally known, opposite the light source 27, as well as possibly a projection optic, which images the light source reflected on the surface to be measured into the optical sensor. Lenses, mirrors, diffractive elements or a shutter can be used, for example, as imaging elements.

A sufficiently large opening 28 through which the measurement light from the measurement object enters into the interior of the second device block 200 and through which also the Illumination light of the light source 27 passes, is provided in the wall of the second device block 200 opposite the intake lens 21.

The opto-electronic measurement unit 20 is of conventional construction. A detailed description including its connection to an external Computer is found, for example, in US 2005/0052648 A1 (=EP 1507134 A1) and U.S. patent application Ser. No. 11/355,140 of Feb. 15, 2006 (=EP Patent Application No. 06001006 of Jan. 18, 2006). The content of these prior art documents is included in the present disclosure by reference. The person skilled in the art does therefore not require any further description in relation thereto.

In the illustrated exemplary embodiment, the opto-electronic measurement unit 20 is constructed as a grating spectrophotometer. Of course, the opto-electronic measurement unit 20 can also be based on other technologies. Especially, the measurement unit 20 can be constructed as a colourimeter, which is based on three or more filters adapted to the visual perception. The spectrophotometer can furthermore be realized instead of with a grating with at least 3, but typically 6 to 16 filters, which are not specifically adapted to the visual perception. Finally, the measurement unit 20 can also be based on the principle of a single photo diode which is sequentially illuminated by several coloured light sources (for example LEDs). In all mentioned cases, the measurement unit can also be realized by distributed elements instead of in the form of a compact subsystem, The illustrated handheld colour measurement device is further constructed as a peripheral device for connection with an external computer, which means all functions are controlled by the external computer through the communication interface 26 (preferably a USB-interface) and the measurement data produced are transmitted to the computer, where they can be further processed. Of course, the handheld colour measurement device can also be constructed as an autonomous measurement device whereby the additionally required functional elements (control and display units, power supply) must be provided in the device itself.

Figure 9:
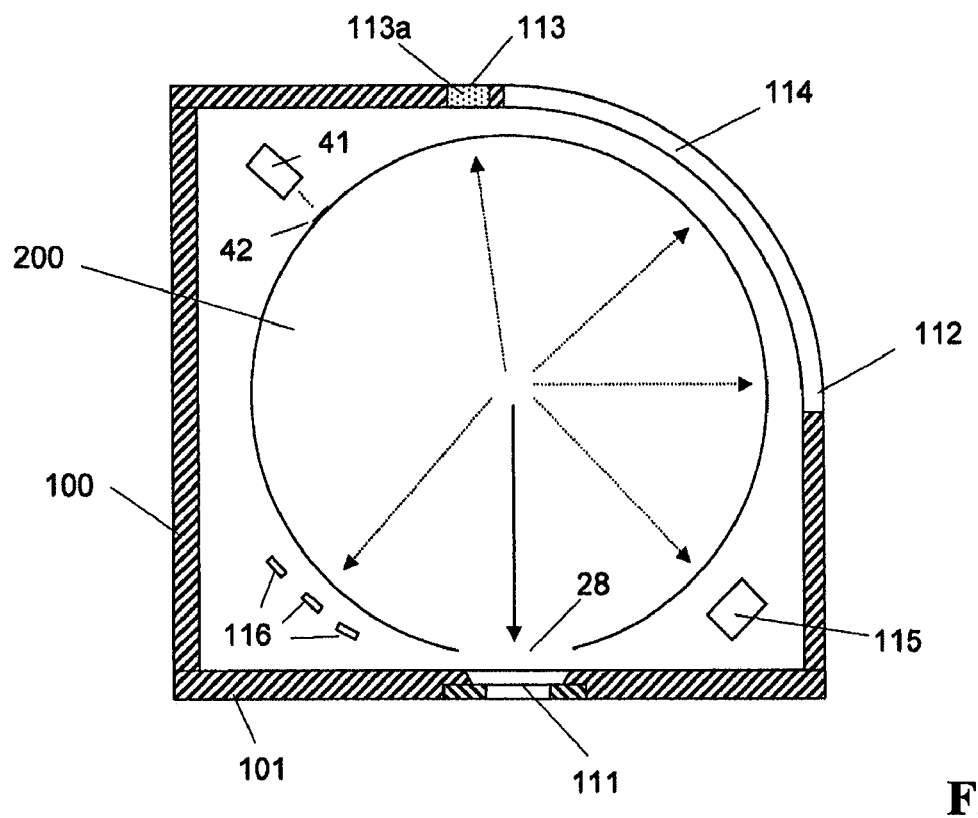
FIG. 9 a schematic sectional illustration of the handheld colour measurement device for the illustration of the functioning in different applications.

All passive components of the handheld colour measurement device are housed in the first (here outer) housing block 100, which are necessary for the different applications of the measurement device. Essentially, those are various measurement windows 111-114 in the surrounding walls of the first housing block as well as a white reference standard 115 in the inner periphery of the first housing block and possibly also colour reference standards 116, which are used for the adjustment or calibration of the device. This is schematically illustrated in FIG. 9. The handheld colour measurement device is in this example equipped for the applications "spot measurement" (usual measurement at a single measurement location on a substrate), "serial measurement" (automatic measurement at a series of measurement locations on a substrate), "monitor measurement", "projector measurement", "ambient light measurement", "white reference measurement" and "colour reference measurement".

Each specific application is associated with a use position of the second housing block 200 relative to the first housing block 100, in which use position the measurement opening 28 of the second housing block 200 is located in front of respectively one of the measurement windows 111-114 or the white reference standard 115 or the colour reference standards 116. In FIG. 9, the measurement opening 28 is located, for example, in front of the measurement window 111 located in the flat base wall 101 of the first housing block. The selection of the different applications for the adjustment of the colour measurement device to the different applications is then carried out by corresponding (rotational) adjustment of the inner housing block 200 relative to the outer housing block 100 (see especially FIG. 9).

In order to facilitate this rotational adjustment, it is practical to shape one or both of the housing blocks so that they can be gripped well by the fingers of the user. This can be achieved, for example, by corresponding bulges, openings, recesses, etc. A bulgeshaped protrusion 201 of the second housing block 200 is apparent in FIGS. 1, 2 and 10.

Figure 7:
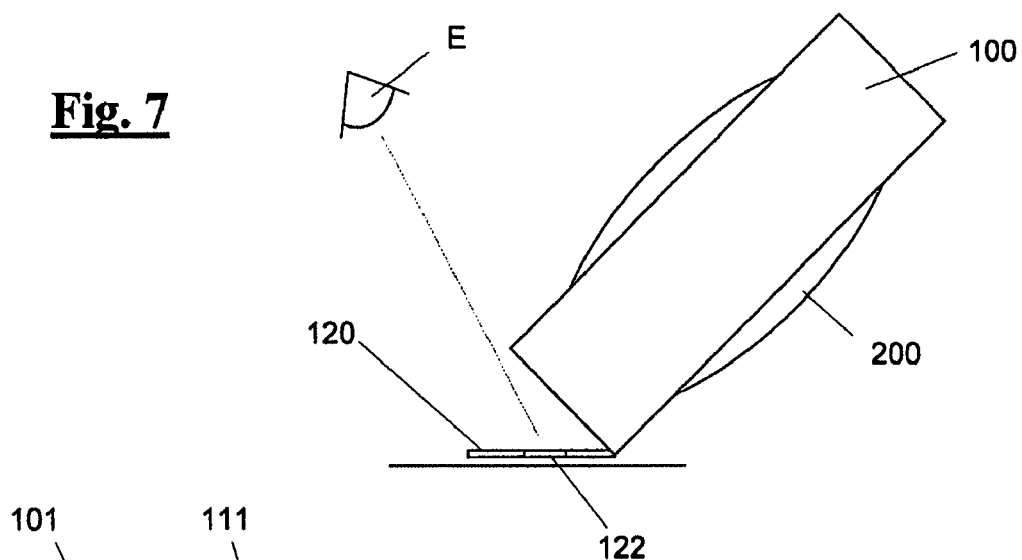
FIGS. 7-8 two sketches for the illustration of an aiming device provided an the handheld colour measurement device.
Figure 8:
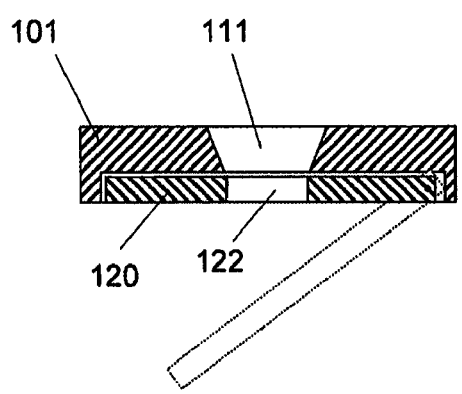

A main measurement window 111 is positioned in the flat base wall 101 of the first housing block 100 for the spot measurement, the most common application. Furthermore, a foldable sighting element 120 is located in the region of this main measurement window 111. As shown in FIGS. 7 and 8, the sighting element 120 is reset into the base wall 101. In order to position the handheld colour measurement device on the measurement point, the aiming aid 120 is folded out by Operation of a release button 121 (FIGS. 1 to 4) and positioned with its target opening 122 on the measurement spot. The measurement device is thereby held obliquely so that the user (eye symbol E) can look through the sighting element 120 onto the measurement spot. Subsequently, the measurement device is righted up and the aiming aid 120 is thereby again folded back into the base wall 101. One proceeds analogously for serial measurements. As soon as the colour measurement device is positioned on the first measurement spot, a serial measurement process ("scan") is initiated and the colour measurement device is thereby simultaneously moved manually along the line of measurement locations, generally a colour measurement strip. It is understood that this is only reasonably possible with measurement Fields of a sufficiently large surface. However, the scanning along a measurement strip is highly facilitated by the relatively small size of the supporting surface of the colour measurement device. This can be further supported by suitable markings in the housing block 100. Furthermore, the sliding can be supported by corresponding elements in the base wall 101. Such elements can be gliding dots, gliding strips, rollers, balls, wheels, etc.

Figure 10:
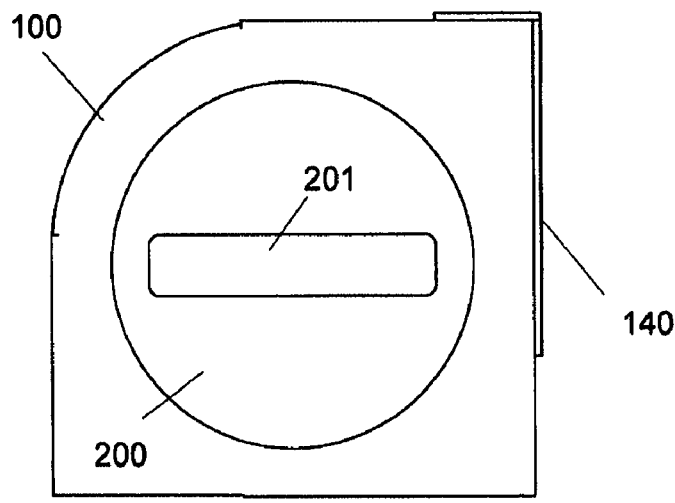
FIG. 10 a schematic side view of the handheld colour measurement device with an integrated fastening hook.
Figure 11:
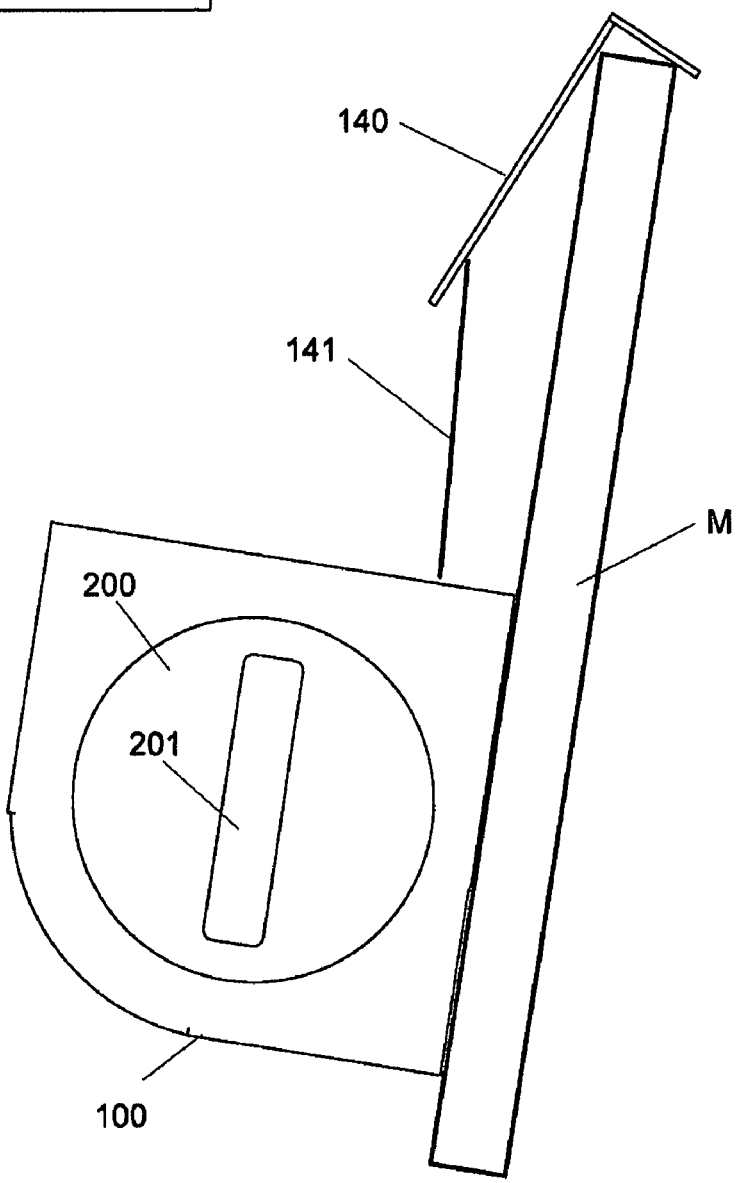
FIG. 11 a handheld colour measurement device in the practical use during measurement on a monitor.

For measurements on a monitor, the outer housing block 100 is provided with an integrated hook 140 apparent from FIGS. 10 and 11 by which the handheld colour measurement device can be suspended on the monitor M to be measured, as shown in FIG. 11. The measurement of the monitor is thereby carried out by way of the main window 111 in the flat base wall 101 of the first housing block 100. The hook 140 is removably fastened to the first housing block 100 in a suitable manner and connected therewith by way of a short string, or chain, or a wire, or a rope 141. Since the hook is a fixed component of the device, the so far common cumbersome mounting of an accessory for the fastening to the monitor is obviated. By mounting the handheld colour measurement device to the monitor by way of a hook, the use of a heavy counterweight is obviated.

Alternatively, a monitor measurement window 112 can be provided for the measurement on a monitor. This window can also be located at the side of the housing. It is furthermore possible to integrate the monitor measurement window 112 into a projector measurement window 114 (see further below). The colour measurement device can thereby be simply positioned in front of the monitor to be measured and the so far common cumbersome mounting on the monitor by way of accessory parts is obviated. This application can be carried out in addition to or instead of the above mentioned measurement for which the device is hung on the monitor and is in contact with the monitor.

An ambient light measurement window 113 is provided in the first housing block 100 for the ambient light measurement, which is about diagonally opposite, which means displaced by about 180°, of the main measurement window 111 at the upper side of the housing block 100. A scatter disk 113a is preferably positioned in this measurement window 113.

Finally, a projector measurement window 114 is provided in the rounded part of the housing block 100 for the measurement on projector surfaces, which are illuminated, for example, by an electronic projector (beamer). It is of elongated shape and extends over an arc of about 60°. The measurement light originating from the projection surface to be measured can enter into the colour measurement device through this projector measurement window. The opto-electronic measurement device 20 can thereby be optimally aimed at the projection surface to be measured (elevation angle) without any additional means by rotational adjustment of the second housing block 200 (for example in discrete steps). The lower most part of the projection measurement window 114 can at the same time also form the already mentioned monitor measurement window 112.

Generally known detent means are provided to lock the second housing block 200 and thereby the opto-electronic measurement unit 20 in the respectively desired application positions. They can consist, for example, of cutouts 40 at the outer circumference of the second housing block 200 into which a cam 41 in the first housing block engages under spring bias. The cam 41 can thereby also function at the same time as position sensor and can deliver a corresponding position signal to the control electronic 25 which can then be used for the adjustment of the measurement sequences or evaluation of the measurement data required for the respective application function. Of course, the position of the second housing block can also be captured by way of another sensor which detects, for example, markings positioned on the circumferential wall of the second housing block, as symbolically illustrated in FIG. 9. The reaching of a defined use position or the snapping into the latter can be signaled to the user of the measurement device in suitable manner either acoustically or optically by way of the control electronic 25.

A further intuitive control of the adjusted use positions or functions can be achieved by pictograms which are placed on one housing block and by an index on the other housing block.

The drum shaped outer shape of the second housing block 200, which is here illustrated only as an example, has the advantage that in certain application positions, for example during the measurement of a white reference standard or the colour reference standards, all measurement windows 111-114 in the first housing block 100 are closed and the measurement device is thereby protected from infiltration of undesired light and dirt. A separate park position for the second housing block 200 can possibly also be provided for this protective function.

It is possible that individual or all measurement applications are not carried out in internally separate use positions (measurement positions) but separate with the same measurement window. Especially, the functions individual measurement ("spot") and serial measurement ("scan"), the functions individual measurement, serial measurement and monitor measurement can be carried out in one and the same measurement window.

It is further possible to transport the light to be measured for individual or all measurement functions over a certain length and to redirect it by a certain angle, for example 90°. Individual or all measurement windows can thereby be brought into a position optimal for the measurement. Especially for the monitor measurement, the measurement device can be constructed such that it lies flat against the screen to be measured during the measurement. In the described exemplary embodiment, a wired interface 26 is provided for 30 communication within the external Computer. Of course, wireless or infrared interfaces can also be provided.

For certain applications, namely for the measurement of ambient light, of monitors at a distance or of the reflection from a projector, it can be advantageous to equip the handheld colour measurement device with a tripod mount. This tripod mount is preferably threaded and is located at the housing block 100 preferably at the underside 101 of the device. Finally, it can also be advantageous to provide the colour measurement device with shock absorbing elements, for example foam elements, in order to insure the application even under rough environmental conditions.

Figure 12:
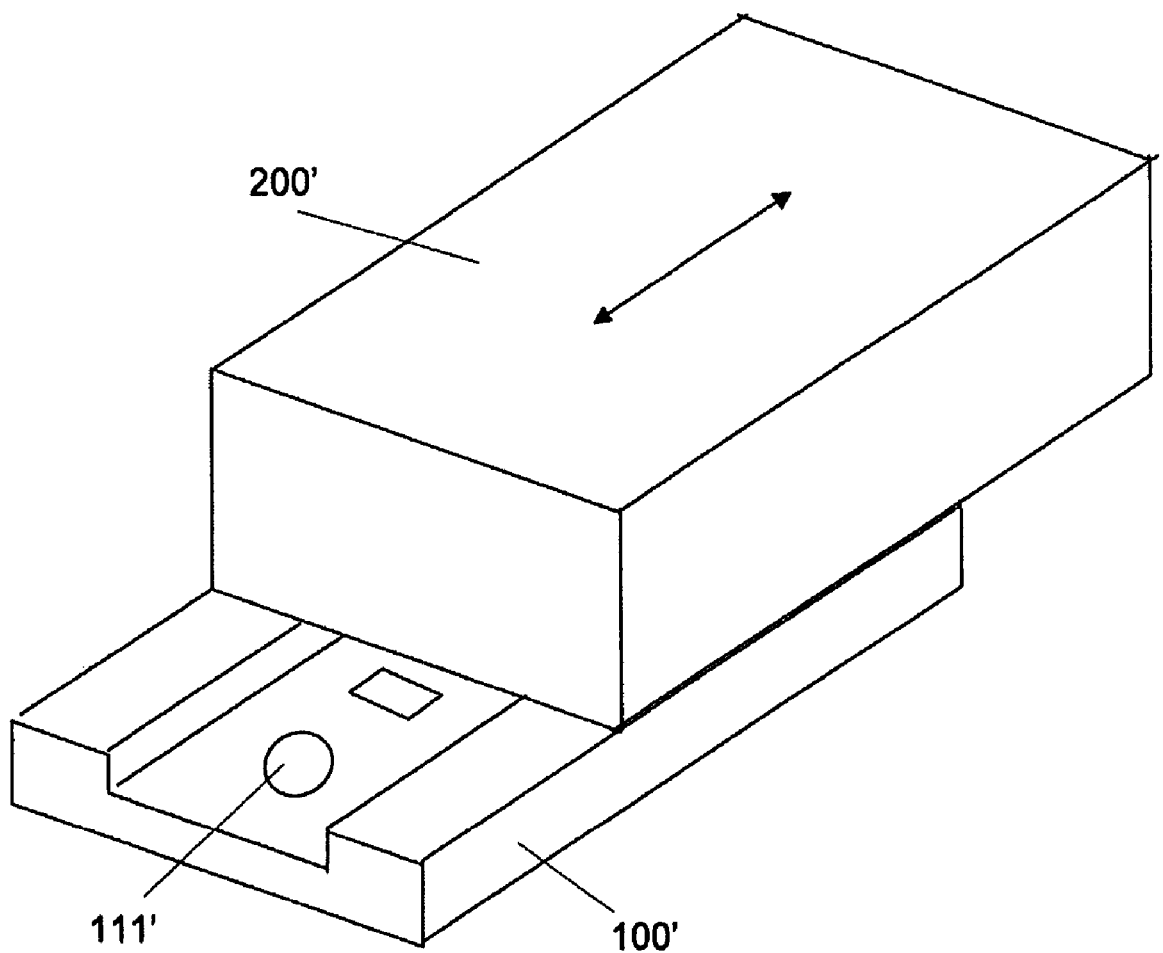
FIG. 12 a highly simplified principal sketch of a second exemplary embodiment of the handheld colour measurement device in accordance with the invention.

In the exemplary embodiment illustrated in FIGS. 1 to 11, the second housing block 200 is rotationally adjustably supported in the first housing block 100. Alternatively, the two housing blocks can also, for example, be movable linearly relative to one another, as is illustrated in the principle sketch of FIG. 12. The first housing block 100' thereby forms a supporting base for the measurement device. In this variant embodiment, the mutual adjustability of the two housing blocks 100' and 200' can also be facilitated by corresponding construction of gripping means for the user. The measurement windows and control elements are correspondingly positioned differently than in the exemplary embodiment of FIGS. 1 to 11.

These and other variations upon and modifications to the described embodiments are provided for by the present invention, the scope of which is limited only by the following claims.

What is claimed is:

1. A handheld colour measurement device with a housing in which an opto-electronic measurement unit is located which receives measurement light originating from a measurement object and converts it into corresponding electric measurement signals and processes the measurement signals into digital measurement data characterizing the colour of the measurement object, and having passive components required for the realization of different application functions, which components can be selectively moved into the measurement beam path, wherein the passive components are positioned in a first housing block, that the opto-electronic measurement unit is located in a second housing block, and that the second housing block is adjustable relative to the first housing block to several, defined application positions in which application positions one of the passive components is respectively located in the measurement beam path of the opto-electronic measurement unit, wherein the second housing block is rotatably adjustably positioned in the first housing block, and wherein the first housing block is externally at least of annular shape and that the second housing block externally is at least of drum shape and is positioned in the interior of the first housing block for rotational adjustment about its axis.

2. The handheld colour measurement device according to claim 1, wherein releasable detent means are provided to hold the second housing block in the different application positions relative to the first housing block.

3. The handheld colour measurement device according to claim 1, wherein the second housing block is positioned to be translatable relative to the first housing block.

4. The handheld colour measurement device according to claim 1, wherein the first housing block forms at least a part of the housing or a supporting base of the handheld colour measurement device.

5. The handheld colour measurement device according to claim 3, wherein at least one of the first housing block and the second housing block is provided with gripping aids which facilitate a rotational or translational movement by the user.

6. The handheld colour measurement device according to claim 1, wherein at least one of the first housing block and the second housing block is provided with gripping aids which facilitate a rotational or translational movement by the user.

7. The handheld colour measurement device according to claim 1, wherein the first housing block has a flat portion which forms a supporting base for the handheld colour measurement device.

8. The handheld colour measurement device according to claim 7, wherein one main measurement window is located in the region of the flat portion.

9. The handheld colour measurement device according to claim 8, wherein the main measurement window is constructed for at least one of the three application functions individual measurement, serial measurement and monitor measurements.

10. The handheld colour measurement device according to claim 1, wherein one ambient light measurement window is located at the upper surface of the first housing block and is provided with a scattering disk.

11. The handheld colour measurement device according to claim 1, wherein the first housing block has an elongated projector measurement window which is located in the lateral upper portion of the first housing block and extends over an arc of at least 60°.

12. The handheld colour measurement device according to claim 1, wherein the first housing block is provided with a white reference standard which is located in the measurement beam path of the opto-electronic measurement unit in one of the application positions of the second housing block.

13. The handheld colour measurement device according to claim 1, wherein the first housing block is provided with at least one colour reference standard which is located in the measurement beam path of the opto electronic measurement unit in one of the application positions of the second housing block.

14. The handheld colour measurement device according to claim 12, wherein at least one of the white reference standard and a colour reference standard is located in the interior of the first housing block between measurement windows.

15. The handheld colour measurement device according to claim 13, wherein at least one of a white reference standard and the colour reference standard is located in the interior of the first housing block between measurement windows.

16. The handheld colour measurement device according to claim 1, wherein the opto-electronic measurement unit includes a light source for the illumination of the measurement object.

17. The handheld colour measurement device according to claim 16, wherein the opto-electronic measurement unit includes at least one additional optical sensor for the capture of measurement light directionally reflected by the measurement object.

18. The handheld colour measurement device according to claim 17, wherein optical means are provided to redirect the directionally reflected measurement light onto the additional optical sensor or to image the light source emitting this measurement light onto the sensor.

19. The handheld colour measurement device according to claim 8, wherein a flip-up aiming aid is provided in the region of the main measurement window.

20. The handheld colour measurement device according to claim 1, wherein it is equipped with an integrated monitor holder for the mounting to a monitor to be measured.

21. The handheld colour measurement device according to claim 1, wherein it is equipped with a screw-on tripod holder.

22. The handheld colour measurement device according to claim 1, wherein a flat portion of the first housing block is provided with gliding elements.

23. A handheld colour measurement device with a housing in which an opto-electronic measurement unit is located which receives measurement light originating from a measurement object and converts it into corresponding electric measurement signals and processes the measurement signals into digital measurement data characterizing the colour of the measurement object, and having passive components required for the realization of different application functions, which components can be selectively moved into the measurement beam path, wherein the passive components are positioned in a first housing block, that the opto-electronic measurement unit is located in a second housing block, and that the second housing block is adjustable relative to the first housing block to several, defined application positions in which application positions one of the passive components is respectively located in the measurement beam path of the opto-electronic measurement unit, wherein the first housing block is at its outside provided with several measurement windows through which measurement light can reach the optoelectronic measurement unit from the outside, whereby in each application position of the second housing block respectively only one of the measurement windows is located in the measurement beam path.

24. A handheld colour measurement device with a housing in which an opto-electronic measurement unit is located which receives measurement light originating from a measurement object and converts it into corresponding electric measurement signals and processes the measurement signals into digital measurement data characterizing the colour of the measurement object, and having passive components required for the realization of different application functions, which components can be selectively moved into the measurement beam path, wherein the passive components are positioned in a first housing block, that the opto-electronic measurement unit is located in a second housing block, and that the second housing block is adjustable relative to the first housing block to several, defined application positions in which application positions one of the passive components is respectively located in the measurement beam path of the opto-electronic measurement unit, and wherein the device further includes a position sensor for capturing the application positions of the second housing block relative to the first housing block.

25. A handheld colour measurement device with a housing in which an opto-electronic measurement unit is located which receives measurement light originating from a measurement object and converts it into corresponding electric measurement signals and processes the measurement signals into digital measurement data characterizing the colour of the measurement object, and having passive components required for the realization of different application functions, which components can be selectively moved into the measurement beam path, wherein the passive components are positioned in a first housing block, that the opto-electronic measurement unit is located in a second housing block, and that the second housing block is adjustable relative to the first housing block to several, defined application positions in which application positions one of the passive components is respectively located in the measurement beam path of the opto-electronic measurement unit, wherein at least one application position is provided for the second housing block in which all measurement windows of the device are closed.

26. A handheld colour measurement device with a housing in which an opto-electronic measurement unit is located which receives measurement light originating from a measurement object and converts it into corresponding electric measurement signals and processes the measurement signals into digital measurement data characterizing the colour of the measurement object, and having passive components required for the realization of different application functions, which components can be selectively moved into the measurement beam path, wherein the passive components are positioned in a first housing block, that the opto-electronic measurement unit is located in a second housing block, and that the second housing block is adjustable relative to the first housing block to several, defined application positions in which application positions one of the passive components is respectively located in the measurement beam path of the opto-electronic measurement unit, wherein the first housing block has an elongated projector measurement window which is located in the lateral upper portion of the first housing block and extends over an arc of at least 60°, and wherein all measurement windows are closed when the second housing block is in an application position intended for the measurement of at least one of a white reference standard and a colour reference standard.

27. A handheld colour measurement device with a housing in which an opto-electronic measurement unit is located which receives measurement light originating from a measurement object and converts it into corresponding electric measurement signals and processes the measurement signals into digital measurement data characterizing the colour of the measurement object, and having passive components required for the realization of different application functions, which components can be selectively moved into the measurement beam path, wherein the passive components are positioned in a first housing block, that the opto-electronic measurement unit is located in a second housing block, and that the second housing block is adjustable relative to the first housing block to several, defined application positions in which application positions one of the passive components is respectively located in the measurement beam path of the opto-electronic measurement unit, wherein the first housing block is provided with a white reference standard which is located in the measurement beam path of the opto-electronic measurement unit in one of the application positions of the second housing block, and wherein all measurement windows of the device are closed when the second housing block is in an application position intended for the measurement of at least one of the white reference standard and a colour reference standard.

* * * * *